July 29, 1924.
B. GOLDMAN
TIRE PROTECTOR
Filed March 27, 1923
1,503,265
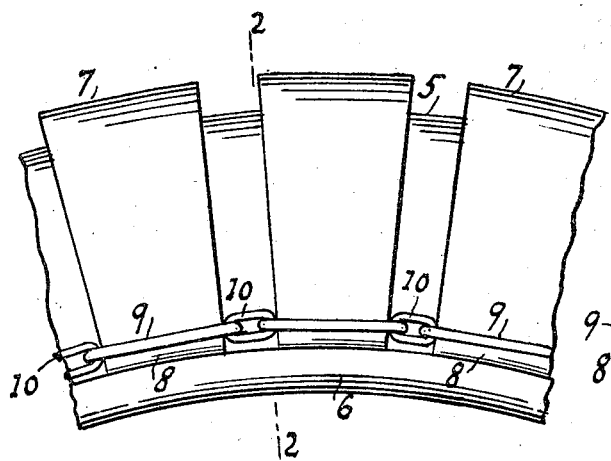
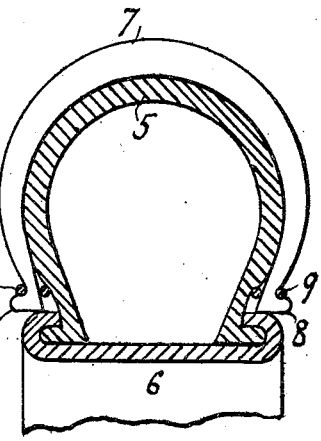
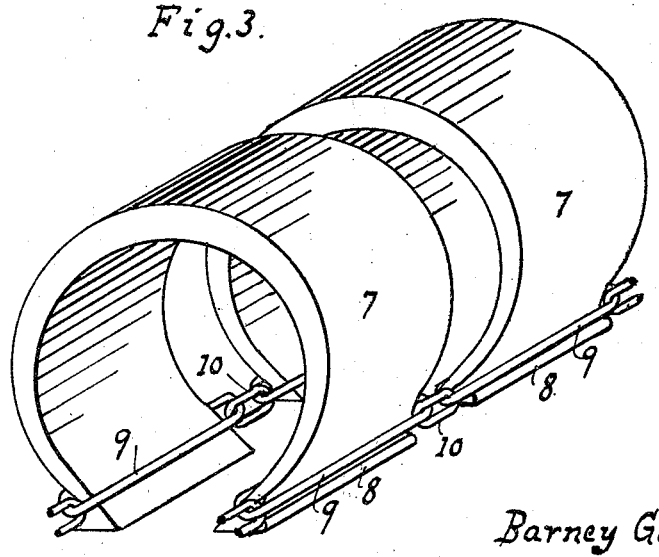
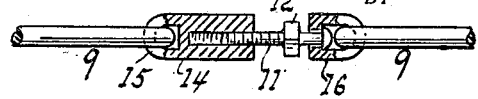
INVENTOR.
Barney Goldman
BY
Hauff Harland
ATTORNEYS Patented July 29, 1924.

1,503,265

UNITED STATES PATENT OFFICE.

BARNEY GOLDMAN, OF NEW YORK, N. Y.

TIRE PROTECTOR.

Application filed March 27, 1923. Serial No. 627,950.

*To all whom it may concern:*

Be it known that I, BARNEY GOLDMAN, a citizen of the United States, residing at New York, in the county of New York and State of New York, have invented new and useful Improvements in Tire Protectors, of which the following is a specification.

This invention relates essentially to a pneumatic tire protector which includes a plurality of elastic tread segments made to embrace the tire and coupled together by a succession of chain links.

An object of the invention is to provide a chain having alternate links which are adapted to divide the tread segments and at the same time permit a segment to adjust itself to the periphery of a tire independent of the other segments.

Another object of the invention is to weld the ends of each link thus providing a cable chain with smooth unbroken surface without any projecting parts to cause accidents by broken links or lodgment of dirt.

The invention resides more particularly in the novel combinations hereinafter described and claimed, reference being made to the accompanying drawing in which:—

Fig. 1 is a side elevation of a portion of a tire embodying this invention.

Fig. 2 is a vertical transverse section taken along the line 2 2 of the same.

Fig. 3 is a perspective view of two of the segments.

Fig. 4 is a side view partly in section of two end links.

In the drawing is shown a pneumatic casing 5 which is clinched to a wheel rim 6 as is well known. On the casing is arranged a series of elastic spaced tread segments 7 frictionally held thereon by the inflation of the casing. Each segment embraces the casing and the ends thereof are provided with projecting beads 8 one being opposite the other.

The tread segments are coupled together by a chain which includes a link 9 looped about the casing adjacent the bead. The link has its ends welded together after it is arranged about the casing so that the joint will not show and the inner and outer surface of the casing and the bead prevents it from falling off. There are two of the links fitted to each segment one being similar to the other. The loop portion of the link projects beyond the ends of the segment to give room for connecting a small link 10 to the loop.

The small link forms a spacer between two of the segments and it permits universal movement of the segments to automatically adjust themselves to the casing. The link spaces keep the segments a certain distance apart to aid in gripping the ground so as to eliminate skidding and to give better traction. The tread segments prevent wear of the casing and at the same time minimize punctures. They can be spaced any distance apart depending on the length of the intermediate link.

A series of the tread segments can be readily placed over an ordinary casing and the two end segment links detachably connected together by a swivel member shown in Fig. 4. The member includes a threaded stem 11 having an angular portion 12 to be gripped by a tool for turning the stem. The threaded stem engages the socket threads of a coupling 14 provided with an eye 15 for connection with a tread link. The other end of the stem is headed to coact with a swivel link 16 connected to the opposite tread link. When it is desired to remove the tread segments the threaded stem 11 is turned until it moves out of the threaded socket of the coupling.

I claim:—

1. In a tire protector the combination with a plurality of spaced tread segments made to embrace a tire, of an endless link looped about each segment near its end, and a second endless link of smaller length forming a spacer between each segment coacting with the looped portion of the segment link so that a segment will universally adjust itself to the periphery of the tire independent of the other sections.

2. A tire protector comprising a plurality of spaced tread segments, a link looped about each segment, a socket coupling linked to one of the segment links, a threaded stem made to engage the socket, and a swivel link coacting with the stem connected to the opposite segment link.

3. A tire protector comprising a plurality of spaced tread segments, a link looped about each segment, a socket coupling linked to one of the segment links, a headed stem having a threaded end to engage the socket, and a swivel link coacting with the headed end of the stem connected to the opposite link.

In testimony whereof I have hereunto set my hand in the presence of two subscribing witnesses.

BARNEY GOLDMAN.

Witnesses:
 MARGUERITE ALTVATER,
 WILLIAM MILLER.